(12) United States Patent
Hsing

(10) Patent No.: US 6,877,751 B2
(45) Date of Patent: Apr. 12, 2005

(54) INSERTABLE TOOL CONNECTOR

(76) Inventor: Chiu Yung Hsing, No. 56, Nangang Rd., Guoshing Shiang, Nantou (TW), 544

( * ) Notice: Subject to any disclaimer, the term of this patent is extended or adjusted under 35 U.S.C. 154(b) by 183 days.

(21) Appl. No.: 10/401,629

(22) Filed: Mar. 27, 2003

(65) Prior Publication Data

US 2004/0188957 A1 Sep. 30, 2004

(51) Int. Cl.⁷ ............................................ B23B 31/103
(52) U.S. Cl. ........................... 279/14; 279/82; 279/906; 30/392; 30/393; 30/394
(58) Field of Search ....................... 7/165, 167; 279/14, 279/29, 76, 77, 78, 82, 906; 30/392, 393, 394

(56) References Cited

U.S. PATENT DOCUMENTS

| | | | | |
|---|---|---|---|---|
| 1,209,572 A | * | 12/1916 | Fegley | 279/82 |
| 1,307,937 A | * | 6/1919 | Straub | 279/29 |
| 1,653,762 A | * | 12/1927 | Fegley et al. | 279/82 |
| 5,722,805 A | * | 3/1998 | Giffin | 408/239 R |
| 6,349,948 B1 | * | 2/2002 | Wu | 279/77 |
| 6,695,321 B2 | * | 2/2004 | Bedi et al. | 279/22 |
| 6,808,182 B2 | * | 10/2004 | Lin | 279/74 |

* cited by examiner

Primary Examiner—Daniel W. Howell
Assistant Examiner—Michael W. Talbot
(74) Attorney, Agent, or Firm—Charles E. Baxley

(57) ABSTRACT

An insertable tool connector includes a drive body, a bushing, a locking plate, a restoring spring, a positioning ring, and a push ring. Thus, the insertable tool connector that can be used to connect the tools of different types, such as the saw blade, the screwdriver head or the like, thereby enhancing the versatility of the insertable tool connector. In addition, the tool can be mounted on and detached from the drive body of the insertable tool connector rapidly, thereby facilitating the user operating the insertable tool connector.

14 Claims, 4 Drawing Sheets

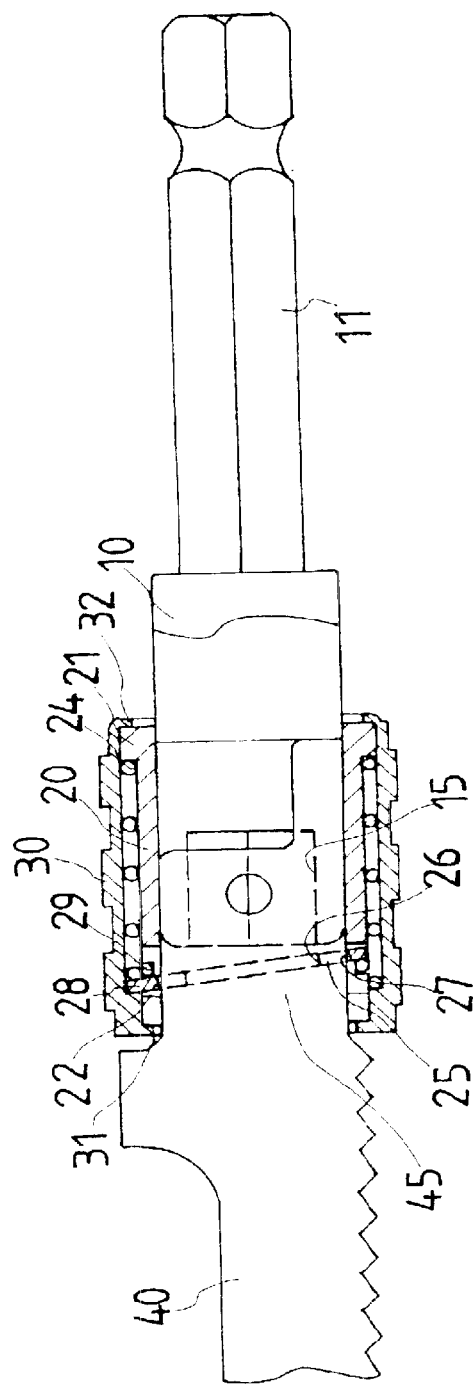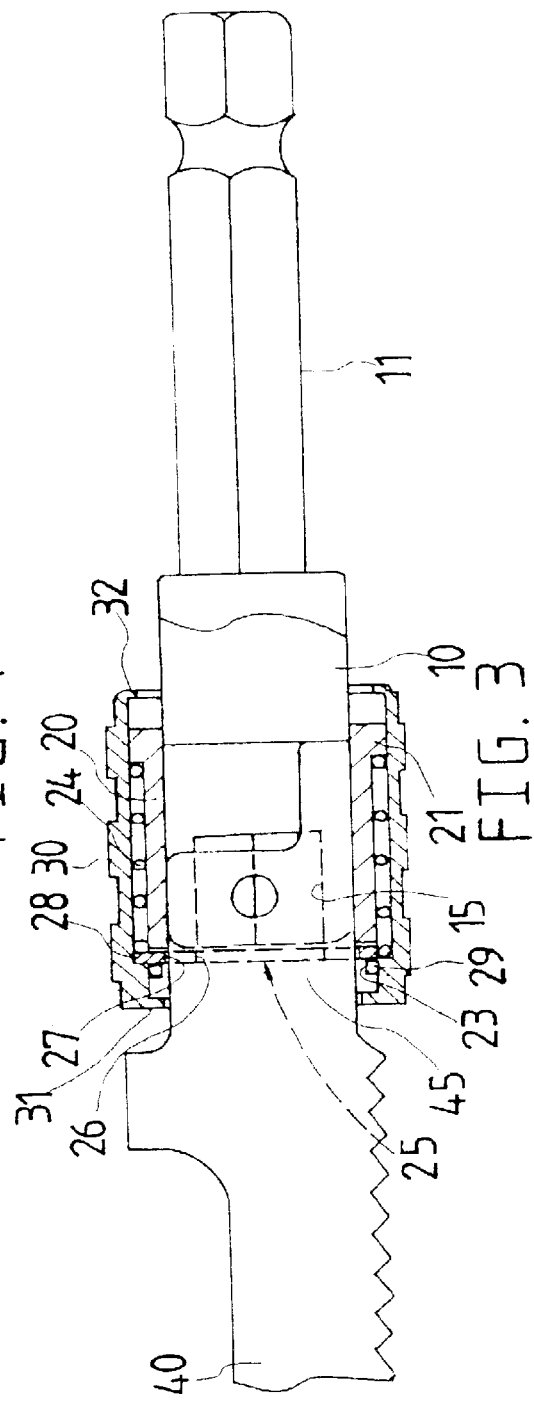

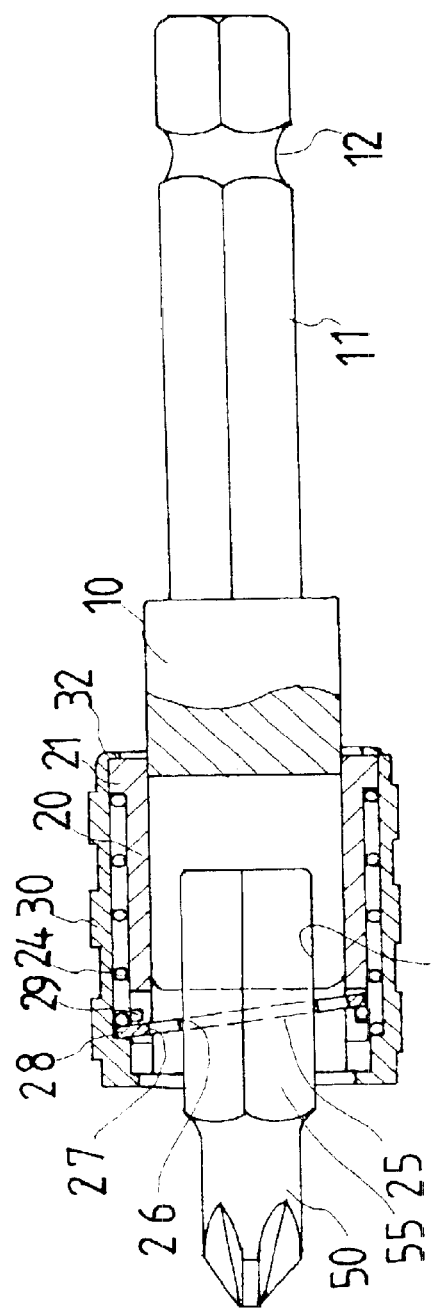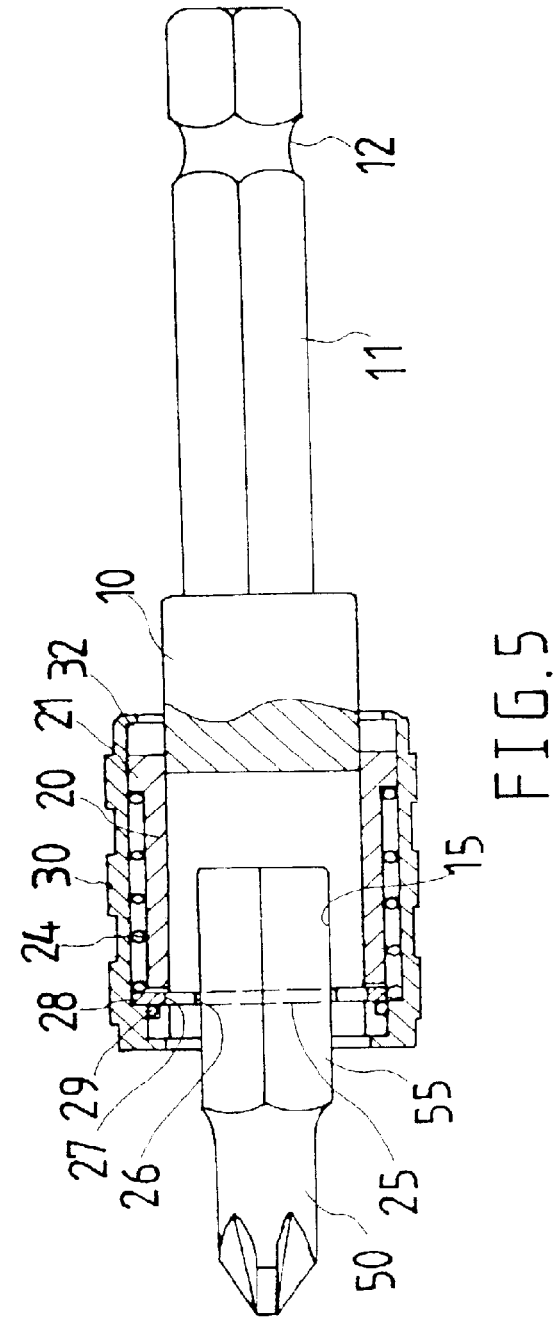

INSERTABLE TOOL CONNECTOR

BACKGROUND OF THE INVENTION

1. Field of the Invention

The present invention relates to an insertable tool connector, and more particularly to an insertable tool connector that can be used to connect the tools of different types, such as the saw blade, the screwdriver head or the like, thereby enhancing the versatility of the insertable tool connector.

2. Description of the Related Art

A conventional tool connector includes a polygonal extension rod that can be inserted into a tool handle. Thus, the tool is inserted into the tool connector so that the tool connector can be used to mount tools of different specifications. However, the tool cannot be inserted into the tool connector rapidly, so that the user cannot use the tool connector to connect the tool easily and conveniently.

SUMMARY OF THE INVENTION

The primary objective of the present invention is to provide an insertable tool connector that can be used to connect the tools of different types, such as the saw blade, the screwdriver head or the like, thereby enhancing the versatility of the insertable tool connector.

Another objective of the present invention is to provide an insertable tool connector, wherein the tool can be mounted on and detached from the drive body of the insertable tool connector rapidly, thereby facilitating the user operating the insertable tool connector.

A further objective of the present invention is to provide an insertable tool connector that can be manufactured and assembled easily and conveniently, thereby decreasing costs of fabrication.

In accordance with the present invention, there is provided an insertable tool connector, comprising a drive body, a bushing, and a push ring, wherein:

the drive body has a front end formed with an insertion hole, the front end of the drive body has a periphery formed with two radially opposite cut slots each communicating with the insertion hole;

the bushing is secured on an outer wall of the drive body and has a rear end formed with an enlarged annular resting flange and a front end formed with two radially opposite recesses each aligning with a respective one of the two cut slots of the drive body;

the insertable tool connector further comprises a locking plate slidably mounted on the front end of the bushing and rested on the front end of the drive body, the locking plate has an outer wall formed with two radially opposite resting blocks each slidably mounted in a respective one of the two recesses of the bushing;

the insertable tool connector further comprises a restoring spring mounted on an outer wall of the bushing and urged between the resting flange of the bushing and a first side of the locking plate;

the insertable tool connector further comprises a positioning ring secured on the front end of the bushing and rested on a second side of the locking plate, the positioning ring is formed with an opening aligning with one of the two recesses of the bushing for passage of one of the two resting blocks of the locking plate; and the push ring is slidably mounted on the outer wall of the bushing and has a front end formed with an annular lip that can be rested on the two resting blocks of the locking plate.

Further benefits and advantages of the present invention will become apparent after a careful reading of the detailed description with appropriate reference to the accompanying drawings.

BRIEF DESCRIPTION OF THE DRAWINGS

FIG. 3 is a partially cut-away front plan cross-sectional view of the insertable tool connector as shown in FIG. 2;

FIG. 4 is a schematic operational view of the insertable tool connector as shown in FIG. 3;

FIG. 5 is a partially cut-away front plan cross-sectional view of the insertable tool connector as shown in FIG. 2; and FIG. 6 is a schematic operational view of the insertable tool connector as shown in FIG. 5.

DETAILED DESCRIPTION OF THE INVENTION

Figure 1:
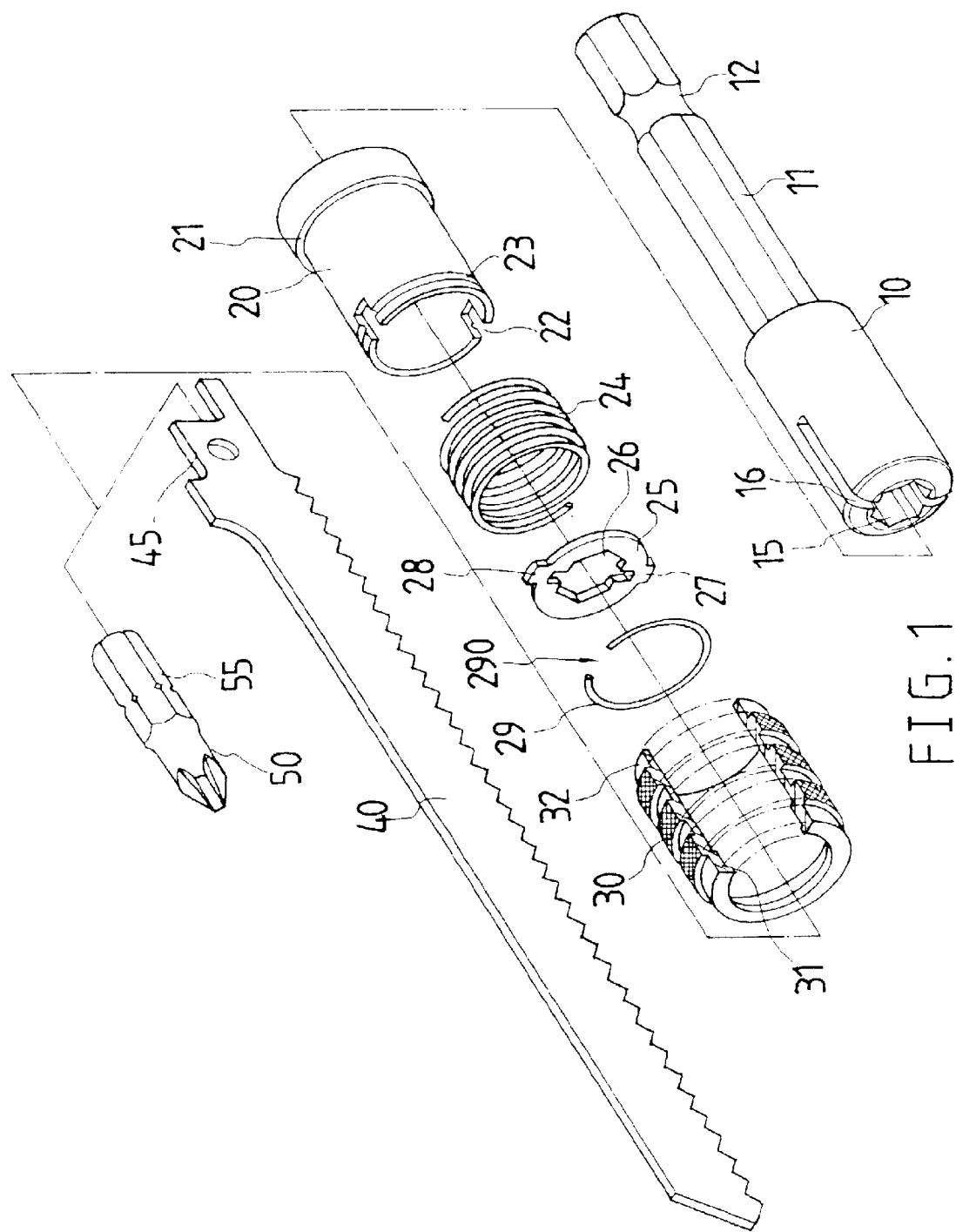
FIG. 1 is an exploded perspective view of an insertable tool connector in accordance with the preferred embodiment of the present invention.
Figure 2:
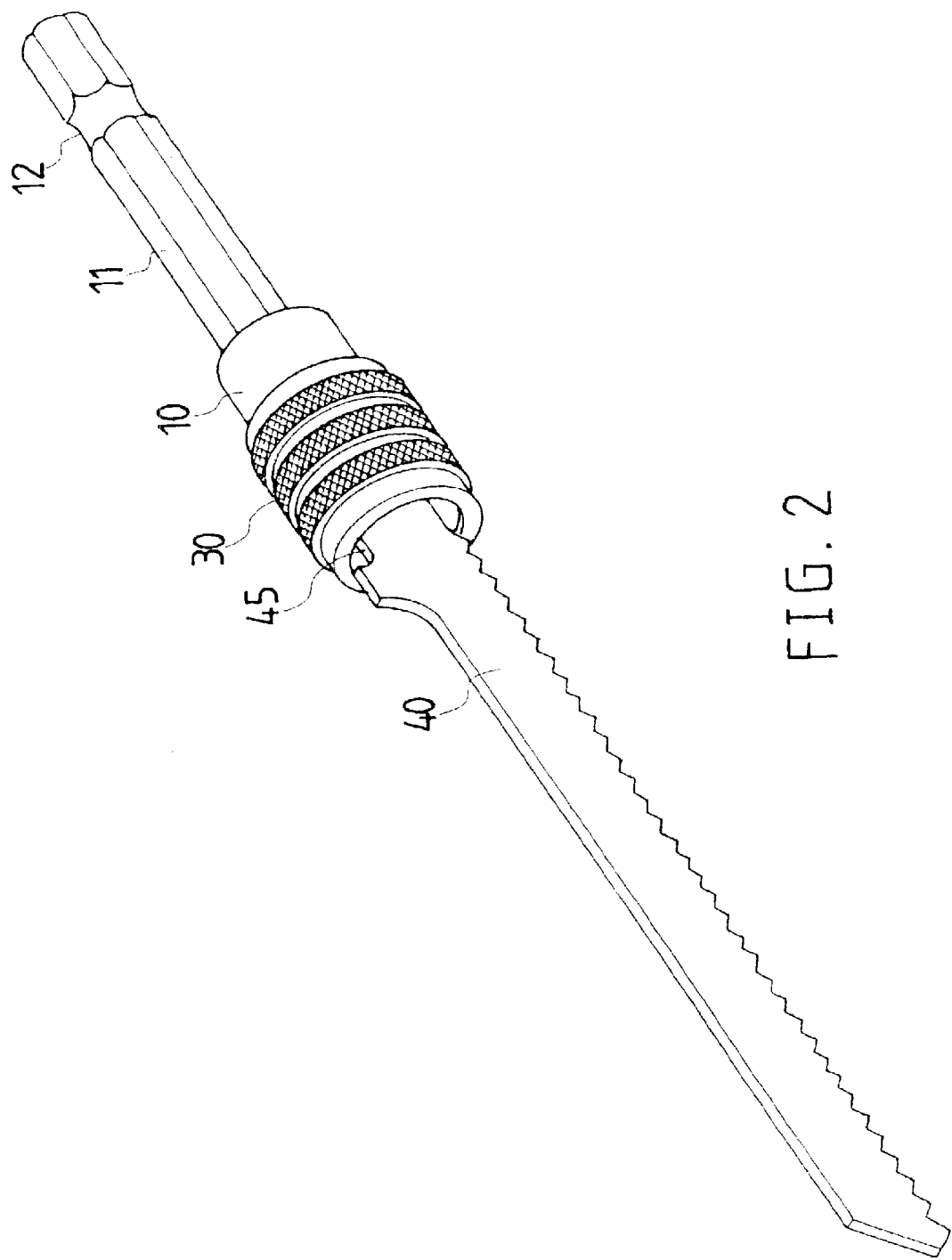
FIG. 2 is a perspective assembly view of the insertable tool connector in accordance with the preferred embodiment of the present invention.

Referring to the drawings and initially to FIGS. 1–3, an insertable tool connector in accordance with the preferred embodiment of the present invention comprises a drive body 10, a bushing 20, and a push ring 30.

The drive body 10 has a rear end provided with a polygonal extension rod 11 that can be inserted into a handle or a drive shank. The extension rod 11 has an end portion formed with a locking groove 12. The drive body 10 has a front end formed with a polygonal insertion hole 15 extended inward. The front end of the drive body 10 has a periphery formed with two radially opposite cut slots 16 each communicating with the insertion hole 15. Preferably, each of the two cut slots 16 has a depth greater than that of the insertion hole 15 as shown in FIG. 3, so as to enhance the stability of the sheet shaped tool.

The bushing 20 is secured on an outer wall of the drive body 10. The bushing 20 has a rear end formed with an enlarged annular resting flange 21. The bushing 20 has a front end formed with two radially opposite recesses 22 each aligning with a respective one of the two cut slots 16 of the drive body 10. The front end of the bushing 20 has an outer wall formed with an annular snap groove 23 communicating with each of the two recesses 22.

The insertable tool connector further comprises a locking plate 25 slidably mounted on the front end of the bushing 20 and rested on the front end of the drive body 10. The locking plate 25 has an outer wall formed with two radially opposite resting blocks 28 each slidably mounted in a respective one of the two recesses 22 of the bushing 20. The locking plate 25 has an inner wall formed with a polygonal locking hole 26 aligning with the insertion hole 15 of the drive body 10. The inner wall of the locking plate 25 has a periphery formed with two radially opposite locking slots 27 each communicating with the locking hole 26 and each aligning with a respective one of the two cut slots 16 of the drive body 10.

The insertable tool connector further comprises a restoring spring 24 mounted on an outer wall of the bushing 20 and urged between the resting flange 21 of the bushing 20 and a first side of the locking plate 25.

The insertable tool connector further comprises a substantially C-shaped positioning ring 29 secured in the snap groove 23 of the bushing 20 and rested on a second side of the locking plate 25. The positioning ring 29 is formed with an opening 290 aligning with one of the two recesses 22 of the bushing 20 for passage of one of the two resting blocks 28 of the locking plate 25.

The push ring 30 is slidably mounted on the outer wall of the bushing 20. The push ring 30 has a front end formed with an annular lip 31 extending radially inward that can be rested on the two resting blocks 28 of the locking plate 25 and a rear end formed with a riveting press edge 32 extending radially inward. In assembly, after the push ring 30 is mounted on the outer wall of the bushing 20, the riveting press edge 32 is pressed radially inward by riveting, so that the push ring 30 is limited to slide on the outer wall of the bushing 20 without detachment.

The insertable tool connector further comprises a saw blade 40 having an end formed with an insertion section 45 extended through the two locking slots 27 of the locking plate 25 and inserted into the two cut slots 16 of the drive body 10. Preferably, the distance between the two locking slots 27 of the locking plate 25 is greater than the width of the insertion section 45 of the saw blade 40.

The insertable tool connector further comprises a screwdriver head 50 having an end formed with an insertion section 55 extended through the locking hole 26 of the locking plate 25 and inserted into the insertion hole 15 of the drive body 10. Preferably, the locking hole 26 of the locking plate 25 has a size greater than that of the insertion section 55 of the screwdriver head 50.

In operation, referring to FIGS. 3 and 4 with reference to FIGS. 1 and 2, the push ring 30 is pushed to move rearward until the annular lip 31 of the push ring 30 is rested on the two resting blocks 28 of the locking plate 25, so that the locking plate 25 is disposed at an upright state as shown in FIG. 3. In such a manner, the distance between the two locking slots 27 of the locking plate 25 is greater than the width of the insertion section 45 of the saw blade 40, so that the saw blade 40 can be inserted into or detached from the two cut slots 16 of the drive body 10.

On the contrary, when the force applied on the push ring 30 is removed, the locking plate 25 is pushed to move forward by the restoring force of the restoring spring 24. At this time, the locking plate 25 is retained by the positioning ring 29, so that the resting block 28 at the lower portion of the locking plate 25 is locked by the positioning ring 29 without movement, and the resting block 28 at the upper portion of the locking plate 25 can pass through the opening 290 of the positioning ring 29 to move forward. In such a manner, the locking plate 25 is disposed at an inclined state as shown in FIG. 4, so that the insertion section 45 of the saw blade 40 is locked by the two locking slots 27 of the locking plate 25, thereby mounting the saw blade 40 on the drive body 10.

Similarly, referring to FIGS. 5 and 6 with reference to FIGS. 1 and 2, the push ring 30 is pushed to move rearward until the annular lip 31 of the push ring 30 is rested on the two resting blocks 28 of the locking plate 25, so that the locking plate 25 is disposed at an upright state as shown in FIG. 5. In such a manner, the locking hole 26 of the locking plate 25 has a size greater than that of the insertion section 55 of the screwdriver head 50, so that the screwdriver head 50 can be inserted into or detached from the insertion hole 15 of the drive body 10.

On the contrary, when the force applied on the push ring 30 is removed, the locking plate 25 is pushed to move forward by the restoring force of the restoring spring 24. At this time, the locking plate 25 is retained by the positioning ring 29, so that the resting block 28 at the lower portion of the locking plate 25 is locked by the positioning ring 29 without movement, and the resting block 28 at the upper portion of the locking plate 25 can pass through the opening 290 of the positioning ring 29 to move forward. In such a manner, the locking plate 25 is disposed at an inclined state as shown in FIG. 6, so that the insertion section 55 of the screwdriver head 50 is locked by the locking hole 26 of the locking plate 25, thereby mounting the screwdriver head 50 on the drive body 10.

Accordingly, the insertable tool connector can be used to connect the tools of different types, such as the saw blade 40, the screwdriver head 50 or the like, thereby enhancing the versatility of the insertable tool connector. In addition, the tool can be mounted on and detached from the drive body 10 of the insertable tool connector rapidly, thereby facilitating the user operating the insertable tool connector. Further, the insertable tool connector can be manufactured easily, thereby decreasing costs of fabrication. Further, the insertable tool connector can be assembled easily and conveniently, thereby saving time and costs.

While the preferred embodiment(s) of the present invention has been shown and described, it will be apparent to those skilled in the art that various modifications may be made in the embodiment(s) without departing from the spirit of the present invention. Such modifications are all within the scope of the present invention.

What is claimed is:

1. An insertable tool connector, comprising a drive body, a bushing, and a push ring, wherein:
   the drive body has a front end formed with an insertion hole, the front end of the drive body has a periphery formed with two radially opposite cut slots each communicating with the insertion hole;
   the bushing is secured on an outer wall of the drive body and has a rear end formed with an enlarged annular resting flange and a front end formed with two radially opposite recesses each aligning with a respective one of the two cut slots of the drive body;
   the insertable tool connector further comprises a locking plate slidably mounted on the front end of the bushing and rested on the front end of the drive body, the locking plate has an outer wall formed with two radially opposite resting blocks each slidably mounted in a respective one of the two recesses of the bushing;
   the insertable tool connector further comprises a restoring spring mounted on an outer wall of the bushing and urged between the resting flange of the bushing and a first side of the locking plate;
   the insertable tool connector further comprises a positioning ring secured on the front end of the bushing and rested on a second side of the locking plate, the positioning ring is formed with an opening aligning with one of the two recesses of the bushing for passage of one of the two resting blocks of the locking plate; and
   the push ring is slidably mounted on the outer wall of the bushing and has a front end formed with an annular lip that can be rested on the two resting blocks of the locking plate.

2. The insertable tool connector in accordance with claim 1, wherein the drive body has a rear end provided with a polygonal extension rod.

3. The insertable tool connector in accordance with claim 2, wherein the extension rod has an end portion formed with a locking groove.

4. The insertable tool connector in accordance with claim 1, wherein the insertion hole of the drive body has a polygonal shape and is extended inward.

5. The insertable tool connector in accordance with claim 1, wherein each of the two cut slots has a depth greater than that of the insertion hole.

6. The insertable tool connector in accordance with claim 1, wherein the front end of the bushing has an outer wall formed with an annular snap groove communicating with each of the two recesses, and the positioning ring is secured in the snap groove of the bushing.

7. The insertable tool connector in accordance with claim 1, wherein the locking plate has an inner wall formed with a polygonal locking hole aligning with the insertion hole of the drive body.

8. The insertable tool connector in accordance with claim 7, wherein the inner wall of the locking plate has a periphery formed with two radially opposite locking slots each communicating with the locking hole and each aligning with a respective one of the two cut slots of the drive body.

9. The insertable tool connector in accordance with claim 1, wherein the annular lip of the push ring is extending radially inward.

10. The insertable tool connector in accordance with claim 1, wherein the push ring has a rear end formed with a riveting press edge extending radially inward, so that the push ring is limited to slide on the outer wall of the bushing without detachment.

11. The insertable tool connector in accordance with claim 8, further comprising a saw blade having an end formed with an insertion section extended through the two locking slots of the locking plate and inserted into the two cut slots of the drive body.

12. The insertable tool connector in accordance with claim 11, wherein the distance between the two locking slots of the locking plate is greater than the width of the insertion section of the saw blade.

13. The insertable tool connector in accordance with claim 7, further comprising a screwdriver head having an end formed with an insertion section extended through the locking hole of the locking plate and inserted into the insertion hole of the drive body.

14. The insertable tool connector in accordance with claim 13, wherein the locking hole of the locking plate has a size greater than that of the insertion section of the screwdriver head.

* * * * *